United States Patent Office 2,725,265
Patented Nov. 29, 1955

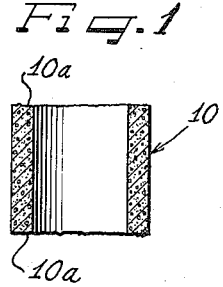
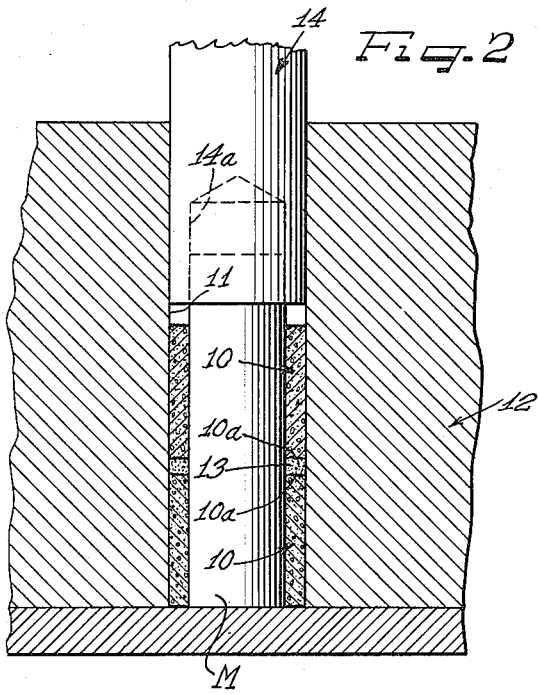
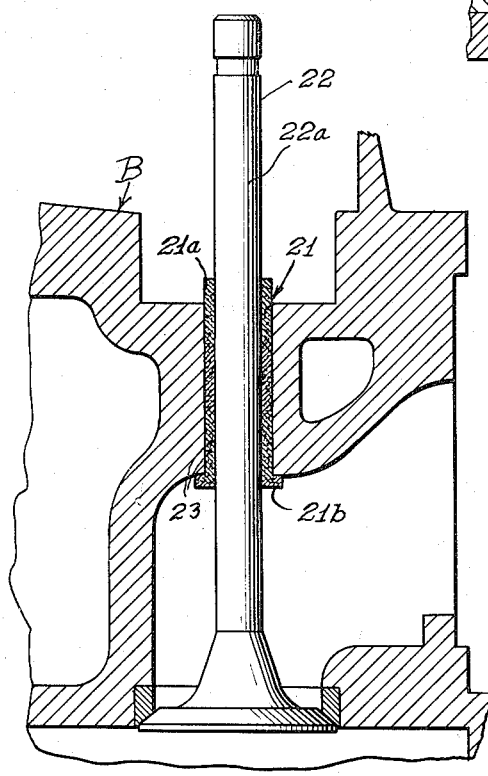
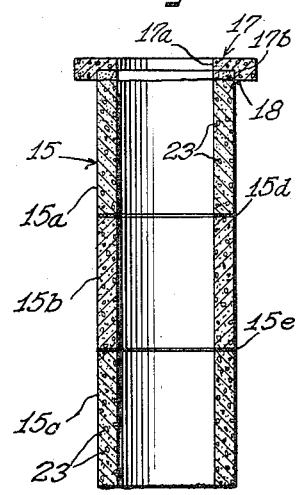
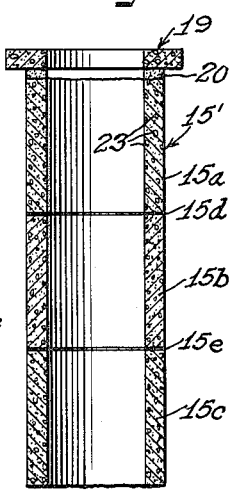

2,725,265

VALVE STEM GUIDES

Leonard G. Daniels and Harold E. Francis, Cleveland, Ohio, assignors to Thompson Products, Inc., Cleveland, Ohio, a corporation of Ohio Application November 26, 1951, Serial No. 258,133

1 Claim. (Cl. 308—4)

The present invention relates to an improved anti-friction member and to a method of making the same.

The present invention is particularly concerned with the production of powdered metal elongated tubular bearing sleeves such as stem guides for poppet valves. Such tubular members are relatively thin and have a length substantially in excess of their diameter. When conventional powder metallurgy techniques are used to produce such members, the results are far from satisfactory from the standpoint of structural strength and uniformity of density. One of the difficulties in manufacturing such elongated articles from powder metal processes is the fact that it is extremely difficult to transmit uniform pressure during compaction to such a long, narrow length, thereby creating a large density gradient in the direction of pressure resulting in insufficient bonding of the metal particles toward the lower end of the piece. Similarly, a radial density gradient occurs in regions of varying cross-sectional area, such as the peripheral flange located at the end of a valve guide.

It is then an object of the present invention to provide a method for forming powdered metal elongated bearing sleeves such as poppet valve stem guides for internal combustion engines.

Another object of the present invention is to provide a method for manufacturing long thin tubular powdered metal bearing sleeves of relative uniform density, both lengthwise and radially.

Still another object of the present invention is to provide a method for assemblying powdered metal segments into an integral rigid, porous bearing member.

Another object of the present invention is to provide a powdered metal bearing element characterized by a high degree of wear resistance, corrosion resistance, resistance to elevated temperatures, and possessing anti-frictional characteristics at elevated temperatures.

Still another object of the present invention is to provide a valve guide composed of individual segments which have been welded together through pressure welding.

Further objects and features of the present invention will be apparent to those skilled in the art from the following description of the attached sheet of drawings which, by way of example, illustrate the process of the present invention as applied to the manufacture of a poppet valve stem guide.

In the drawings:

Figure 1 is a longitudinal cross-sectional view of a preformed tubular powdered metal compact to form a section of a poppet valve stem guide according to this invention;

Figure 2 is a schematic longitudinal cross section illustration of a pair of compacts of the type shown in Figure 1 in a die illustrating the manner in which the compacts are joined in end-to-end relation for forming the valve stem guide;

Figure 3 is a longitudinal cross-sectional view of a multicompact preformed valve stem guide according to this invention and illustrating how one end of the guide can be provided with a recess flange;

Figure 4 is a fragmentary longitudinal cross-sectional view in elevation illustrating a modified form of flange which may be applied to the preformed valve guide;

Figure 5 is a longitudinal cross-sectional view of a valve guide according to this invention mounted for operation in an engine.

As shown in the drawings:

Reference numeral 10 indicates generally a relatively short tubular powdered metal compact to form a segment of a valve stem guide. For the purposes of this invention, the segment 10 may be about one inch long and consist of ordinary finely divided iron powder which has been compressed into a self-sustaining shape, but not sintered. The compact may be formed in any suitable die for powdered metallurgy use. It is desirable to admix a lubricant in the iron powder, such as stearic acid, in the amount of about 1% by weight of the iron powder. Typical pressures involved in the formation of the segment 10 are around 15 tons per square inch.

In the preferred embodiment of the present invention, we prefer to use metal powder mixtures having considerably better anti-frictional properties than iron itself. Under certain operating conditions of internal combustion engines, such as aircraft engines, where rapid wear and damage is encountered between the valve stem and the valve guide, it has been found that ordinary steel or cast iron valves guides frequently do not perform satisfactorily. We therefore prefer to use a material which has sufficient anti-frictional properties, wear resistance, corrosion resistance and resistance to elevated temperatures to withstand operating conditions of 700° to 1000° F., as frequently encountered in an aircraft engine.

These preferred materials are composed of a hard, high temperature resistant metallic skeleton with a high temperature anti-frictional material uniformly distributed as discrete particles in sufficient quantity so that the necessity for supplemental lubrication is minimized or eliminated.

Such anti-frictional materials can be prepared in various processes. Pre-alloyed metal powders may be used in combination with inert, high temperature anti-frictional materials. Similarly, elemental metal powders may be blended and heat treated to produce a hard alloy skeleton. In many cases, through proper selection of materials and heat treatment, reactions between soft metallic powders and high temperature anti-frictional materials produce hard metallic phases suitable for elevated temperature service. In the latter case, an excess of the anti-frictional material may be used to provide free anti-frictional constituents in the hard metal matte.

As typical examples, elemental iron powder to form the compact segment 10 may, in addition to the lubricant, contain from 3% to 20% by weight dry graphite powder and preferably from 7% to 12% to form a blend which will produce a metallic matte chiefly composed of $Fe_3C$, containing residual amounts of free graphite as an anti-frictional agent when the compact is sintered. As another example, the elemental iron powder may be mixed with from 5% to 30% dry molybdenum disulfide powder, and preferably from 14% to 20% of the latter. This blend will produce, when sintered, a multi-phase material having anti-frictional and wear resistant properties at elevated temperatures.

In place of the iron base, various hard, temperature resistant materials such as nickel, cast iron, stainless steel, "stellite" and the like may be used to form the hard metal matrix. In place of, or in addition to the anti-frictional materials previously mentioned, other suitable anti-frictional materials include tungsten disulfide, boron nitride, mica, and the like.

In compacting any powdered metal composition of considerable length, there will inherently be a variation in density between the top of the compact piece which engages the punch, and the opposite lower end. In order that the segments 10 illustrated in Figure 1 can be properly pressure welded to other segments, we have found it desirable to remove the superficial layer of dense cold worked material customarily found on the surfaces of the powdered metal components. Therefore, we prefer to abrade the end faces of the segments 10 to form roughened ends 10a illustrated in Figure 1 to facilitate the subsequent step of pressure welding.

The next step in the process consists in joining two or more of the segments 10 into an integral structure by pressure welding. One assembly for accomplishing this portion of the process is schematically illustrated in Figure 2. As shown in that drawing, a pair of segments 10 may be disposed in stacked relationship within the recess 11 of a die 12. A small amount of metal powder 13 is distributed between the adjoining roughened ends 10a of the segments 10, the powder 13 being preferably of the same composition as that used in the formation of the segments 10. A mandrel M in the form of a rod receives the segments 10 therearound to prevent inward collapse of the segments under heavy end pressure. A plunger 14 operated by hydraulic means, or other suitable pressure means, has a recessed end face 14a receiving the top of the mandrel M therein and acting on the top segment 10 in the die 12 to force the segments 10 toward each other at substantial pressure of about 30 tons per square inch. This pressure forms a unitary tube or sleeve with the segments joined through the interposed powder 13. Where only two segments 10 are used to produce the finished article, it is desirable that the two ends of lowest density be used as the joining faces.

If the complete valve guide is composed of more than two segments 10, additional segments 10 may be used in the die 12 or may be added after the initial pressing by repeating the operations as indicated in connection with the pressure uniting the original two segments. It is usually desirable that the pressures for each step of the operation be adjusted to produce a unitary piece having a minimum of density variation.

If a flange is to be provided on the valve guide, a suitable flange may be joined to the end of the resulting pressed together segments as shown in Figure 3. In Figure 3 a compacted tubular stem guide portion 15 consisting of three individual segments 15a, 15b and 15c joined together at their adjoining faces as indicated at 15d and 15e forms the main body. In a typical aircraft valve stem guide, the total overall length of the guide will be approximately three inches, so that each of the segments making up the guide member will be on the order of one inch in length. Wall thicknesses of the order of .10 to .20 inch are desired in such valve guides and are easily provided by this invention.

If desired, the flange may be made an integral part of one of the segments 10 at the time of the original compaction of the powdered metal segments. We prefer, however, to fabricate the flange separately and join the preformed flange to the pressure welded segments in the manner illustrated in Figure 3. Separate manufacture of the flange is preferred because the pressure of performing the flange may be carefully controlled independently of the remainder of the valve guide to achieve a uniform density.

As illustrated in Figure 3, a powdered metal compact in the form of an apertured disc 17 having an axial bore 17a and a counterbore 17b may be joined to the preformed valve guide portion 15 by distributing additional small amounts of metal powder 18 between the roughened end of the valve guide portion 15a and the bottom of the counterbore 17b. The flange is then joined to the remainder of the valve guide by the application of suitable compacting pressures.

An alternative form of flange assembly which might be employed is illustrated in Figure 4. In this illustration, the end of the preformed valve guide portion 15' is provided with a flat end flange 19 having an axial bore in registry with the axial bore of the preformed valve guide 15'. An additional small amount of metal powder 20 is compressed between the flange 19 and the valve guide portion 15 to achieve the pressure welding between these two members.

After the formation of the valve guide in the manner illustrated, the resulting composite article is sintered in a non-oxidizing atmosphere, such as hydrogen, at sintering temperatures appropriate to the type of metal used in making the compacts. Sintering at 1900° F. to 2050° F. for 30 to 120 minutes is desirable when the composite compact is formed of iron and graphite. This will form the iron carbide matte described above. When the composite compact is composed of iron and molybdenum disulfide, the sintering operation should preferably be carried out at 1700° F. to 1900° F. for about 30 to 90 minutes.

After sintering, the resulting guide is preferably coined under pressures of about 40 tons per square inch in shaping dies to increase in density and strength of the guide.

The sintering operation forms a strong porous stem guide and the joints between the segments become weld bonds providing a unitary structure.

The finished stem guide 21 of Figure 5 is a strong unitary porous bearing sleeve with its tubular portion 21a snugly seated in the body B of an engine and with its end flange 21b bottomed against the engine block on the valve port side. The guide 21 may have a press fit in the body. A poppet valve 22 has its stem 22a slidably guided in the guide and permanently lubricated against seizure by the anti-frictional particles 23 in the porous body.

The above-described process produces a powdered metal thin walled sleeve or valve guide characterized by a relatively uniform density throughout its length and having anti-friction bearing properties even at very high temperatures. Through the use of this process, elongated bearing articles such as valve guides which have a length many times their diameters can be produced rapidly and economically. When the powdered metal compacts employed are composed of the anti-frictional materials including a hard metallic matte and free anti-frictional compounds dispersed therein, the resulting valve guides can be employed at high temperatures, in corrosive atmospheres, and still maintain their anti-frictional characteristics.

It will be understood that modifications and variations may be effected without departing from the scope of the novel concepts of the present invention.

We claim as our invention:

A valve stem guide comprising an article made of a powdered metal composition including a ferrous metal matrix and an inert high temperature resistant anti-frictional material selected from the group consisting of graphite and molybdenum disulfide, said valve stem guide having a plurality of thin-walled cylindrical segments in stacked end-to-end relation and a separate flange member at one end of the guide, and further including an annular bonding joint between end-to-end surfaces of said cylindrical segments and between said flange and an adjoining surface of a cylindrical segment at the end of the stack, said bonding joint consisting of an additional quantity of said powdered metal composition compacted in unitary relation with said segment and said flange member to form the valve stem guide with the configuration of the unitary thin-walled elongated tubular article having a radially outwardly extending flange at one end integral therewith and further including an open-ended bore extending through said valve stem guide forming a continuous cylindrical lubricant-impregnated valve stem bearing surface.

References Cited in the file of this patent

UNITED STATES PATENTS

| | | |
|---|---|---|
| 1,370,346 | Nelson | Mar. 1, 1921 |
| 1,531,267 | Awe | Mar. 31, 1925 |
| 2,156,802 | Cooper | May 2, 1939 |
| 2,341,860 | Ellis | Feb. 15, 1944 |
| 2,350,971 | Pecker et al. | June 4, 1944 |
| 2,399,773 | Waintrob | May 7, 1946 |
| 2,401,483 | Hensel | June 4, 1946 |
| 2,404,808 | Lowey | July 30, 1946 |
| 2,470,264 | Richardson | May 17, 1949 |

FOREIGN PATENTS

| | | |
|---|---|---|
| 565,520 | Great Britain | Nov. 14, 1944 |
| 646,377 | Great Britain | Nov. 22, 1950 |

OTHER REFERENCES

"Materials and Methods," April 1946 issue, pages 987, 988.